United States Patent [19]
Horibata et al.

[11] Patent Number: 5,187,860
[45] Date of Patent: Feb. 23, 1993

[54] METHOD OF MANUFACTURING THIN FILM MAGNETIC HEAD

[75] Inventors: Shinji Horibata; Yuzo Odoi, both of Amagasaki; Syoji Futami, Kamakura, all of Japan

[73] Assignee: Mitsubishi Denki Kabushiki Kaisha, Japan

[21] Appl. No.: 728,623

[22] Filed: Jul. 11, 1991

[30] Foreign Application Priority Data

Jul. 12, 1990 [JP] Japan .................................. 2-186492

[51] Int. Cl.⁵ .............................................. G11B 5/42
[52] U.S. Cl. ...................... 29/603; 360/125; 427/128; 427/131; 427/132
[58] Field of Search ................. 29/603; 427/128, 131, 427/132; 360/119-122, 125-127

[56] References Cited
U.S. PATENT DOCUMENTS

| 4,143,458 | 3/1979 | Gibson ................................. 29/603 |
| 4,841,624 | 6/1989 | Togawa et al. ....................... 29/603 |
| 5,068,959 | 12/1991 | Sidman ................................. 29/603 |

FOREIGN PATENT DOCUMENTS 60-95716 3/1985 Japan .
61-110320 8/1986 Japan .

Primary Examiner—Carl E. Hall
Attorney, Agent, or Firm—Wolf, Greenfield & Sacks

[57] ABSTRACT

A manufacturing method of thin film magnetic head for recovering favorable magnetic characteristics by removing the strain occurring inside the core by heating the laminated body in the final step after laminating lower core, gap, first insulation layer, coil, second insulation layer, upper core and protective film on a substrate.

4 Claims, 7 Drawing Sheets

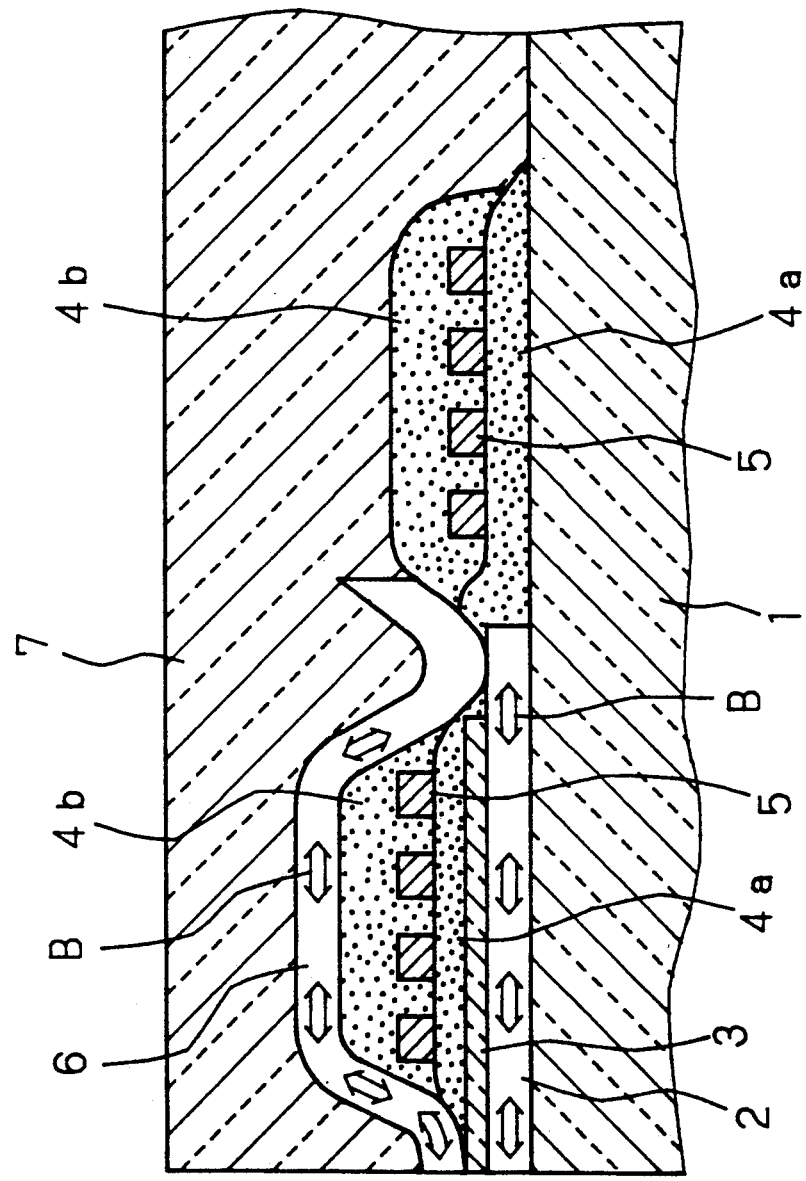

METHOD OF MANUFACTURING THIN FILM MAGNETIC HEAD

BACKGROUND OF THE INVENTION

1. Field of the Invention

The present invention relates to a method for manufacturing thin film magnetic head used in magnetic recording apparatus such as magnetic disk devices or magnetic tape devices.

2. Description of Related Art

Recently, with the progress in magnetic recording technology, the density of magnetic recording medium has become greater and storage capacity has become larger. To cope with this situation, a thin film magnetic head that is manufactured using LSI technology has been used as the magnetic head. FIG. 1 is, for example, a secontional view showing the structure of a thin film magnetic head disclosed in the Japanese Patent Application Laid-Open No. 61-110320 (1986). In the figure, numeral 1 denotes a nonmagnetic substrate made of $Al_2O_3$-TiC or the like, numeral 2 denotes a lower core made of soft magnetic thin film of NiFe, NiCo or other magnetic alloy formed on the substrate by plating, sputtering, vapor deposition or other method, and numeral 3 denotes a gap made of $Al_2O_3$, $SiO_2$ or the like formed by sputtering, vapor deposition or other method. Numerals 4a, 4b denote first and second insulation layers made of inorganic matter such as $Al_2O_3$ or $SiO_2$ formed by vapor deposition or another method, or an organic resin such as resist or polymide hardened by heat, electromagnetic waves or the like, numeral 5 denotes a coil made of Cu or the like formed by plating, sputtering, vapor deposition or other method, numeral 6 denotes an upper core made of NiFe, NiCo or other magnetic alloy formed by plating, sputtering, vapor deposition or another method, and numeral 7 denotes a protective film made of $Al_2O_3$, $SiO_2$ or the like formed by sputtering, vapor deposition or another method.

The recording and regenerating operations performed by the thin film magnetic head will be explained below.

Information is recorded in a magnetic medium by a leakage magnetic flux from the gap 3 at the leading edge of the core. A magnetic flux flows in the lower core 2 and upper core 6 due to the signal current flowing in the coil 5. Information is regenerated by voltage changes at both ends of the coil 5 that are caused by electromagnetic induction. The induction is caused by changes in the magnetic flux flowing in the lower core 1 and upper core 6 that react to the magnetic flux leaking out from the magnetic medium at the gap 3. The soft magnetic thin films of the lower and upper core are intended to effectively converge the signal magnetic flux from the magnetic recording medium to interlink with the coil, and therefore the soft magnetic thin films are required to have high magnetic permeability, excellent frequency characteristics, and faithful response to the signal magnetic flux. Therefore, the soft magnetic thin film is generally provided with uniaxial anisotropy, and it is so designed that the easy magnetization axis may be parallel to the track widthwise direction. In this case, the magnetic domains of the upper core are shaped as shown in FIG. 2(a) (arrow A indicating the track widthwise direction and easy magnetization axis), and the signal magnetic flux is led in a vertical direction relative to the easy magnetization axis, so that high magnetic permeability, excellent frequency characteristic, and faithful signal response may be realized.

Since the thin film magnetic head is composed of sequentially laminating various materials in this way and the NiFe, NiCo or other magnetic alloy used as the magnetic core is generally magnetostrictive, magnetic characteristics of the magnetic core deteriorated due to the countermagnetostrictive effect caused by internal stress, when forming magnetic core film, or external stress, when forming other member film adjacent to the magnetic core. Especially when the effect of stress is great, the shape of the magnetic domain of the magnetic core is disturbed, and irregular noise called wiggle noise, that is attributable to magnetic domain fluctuation, occurs in the regenerated signal from the magnetic head. FIG. 3 shows waveforms of a regenerated signal with wiggle noise (a) and a normally regenerated signal without noise (b). To avoid this problem, efforts have been made to strictly control the composition so as to reduce the magnetostriction of the magnetic core, to zero, to minimize the stress by optimizing the forming conditions of members, or to anneal the soft magnetic thin film. Actually, however, the stress depends on numerous control items, and it is difficult to control by optimizing the film forming conditions.

A conventional attempt to anneal the soft magnetic thin film, is disclosed in the Japanese Patent Application Laid-Open No. 61-95716 (1986). Heat treatment was applied after forming the soft magnetic thin film before forming the protective film. The present inventors attempted to heat the structure at 230° C. in the magnetic field before forming the protective film and after forming the soft magnetic thin film of the upper core. The protective film was formed to complete a magnetic head, and finally it was electrically evaluated, but the wiggle noise as shown in FIG. 3(a) was detected, and it was therefore difficult to reduce the wiggle noise by annealing before forming the protective film.

SUMMARY OF THE INVENTION

The invention is intended to solve the above problems of the prior art.

It is hence a first object of the invention to present a manufacturing method of thin film magnetic head capable of eliminating the strain caused inside the magnetic core and recovering favorable magnetic characteristics, by heating at the final step, after sequentially laminating lower core, gap, first insulation layer, coil, second insulation layer, upper core on a substrate, and a protective layer.

The above and further objects and features of the invention will more fully be apparent from the following detailed description with accompanying drawings.

BRIEF DESCRIPTION OF THE DRAWINGS

FIG. 7 is a conceptual diagram showing the state of the stress applied to the magnetic core in the rehardening step of the insulation layers of the thin film magnetic head manufactured by the method of the invention.

DESCRIPTION OF THE PREFERRED EMBODIMENTS

Figure 1:
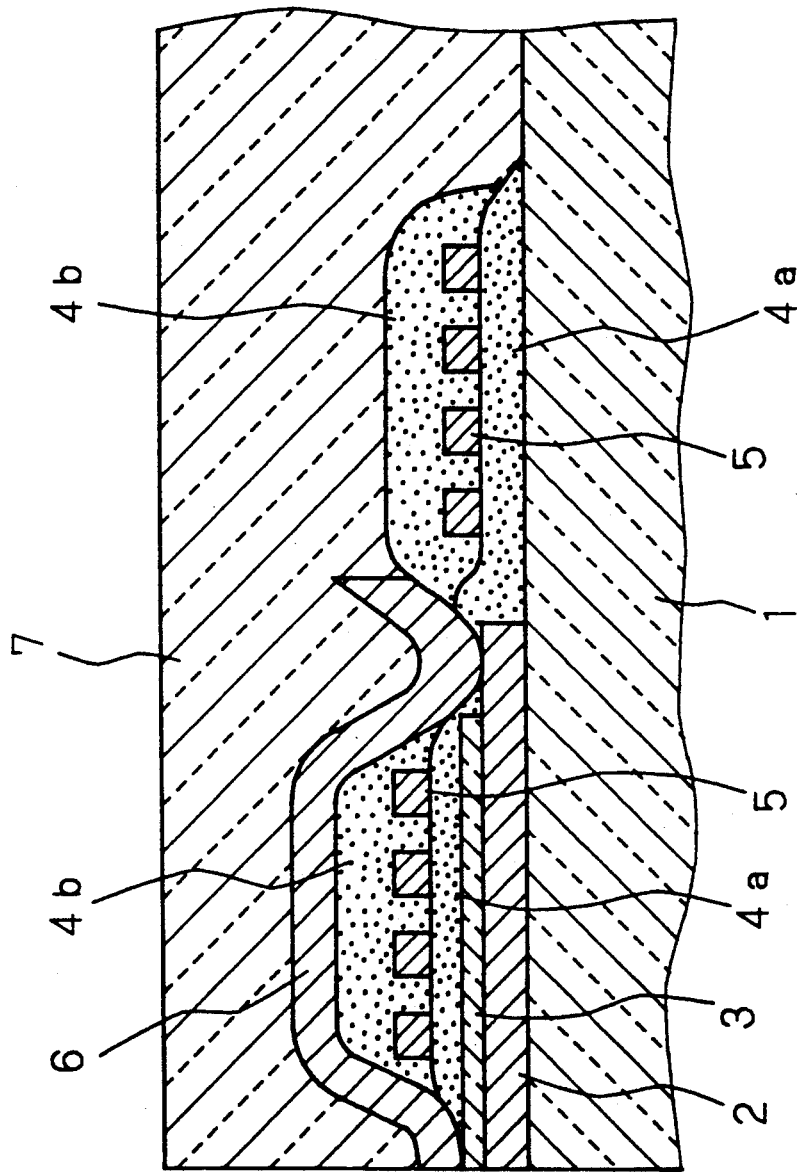
FIG. 1 is a sectional view showing the structure of a thin film magnetic head.

Referring now to the drawings, several preferred embodiments of the invention are described in detail below. In a thin film magnetic head relating to an embodiment of the invention, a first insulation layer 4a and a second insulation layer 4b in FIG. 1 are composed of organic resins, such as, AZ photoresist (AZ is a trade name of Hoechst AG). The resin is thermoset at 240° C., and is manufactured by heating at a temperature above the softening point of the organic resin, after forming a protective film.

Figure 4:
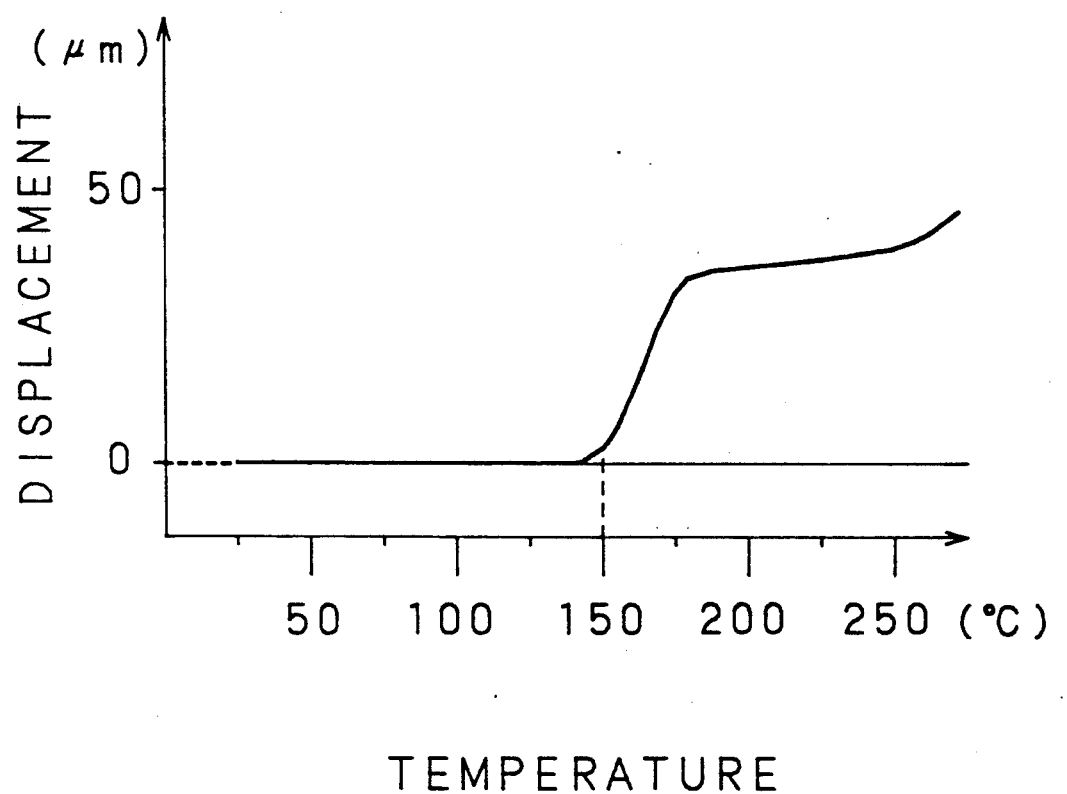
FIG. 4 is a graph showing the relation between the temperature of an organic resin and amount of sinking displacement of a probe into the organic resin, for obtaining the softening point of the organic resin.

FIG. 4 shows the result of measurement of the softening point of the AZ photoresist thermoset at 240° C. To measure the softening point, a weight of about 10 g/mm$^2$ is applied to a probe, and its sinking displacement into the sample the softening point is determined. It is known from FIG. 4 that the sample suddenly softens at around 150° C. (this is the softening point) and is substantially stabilized around 175° C. This measurement proves that the external stress may be absorbed and alleviated by softening through heating the thermoset photoresist over the softening point.

Figure 5:
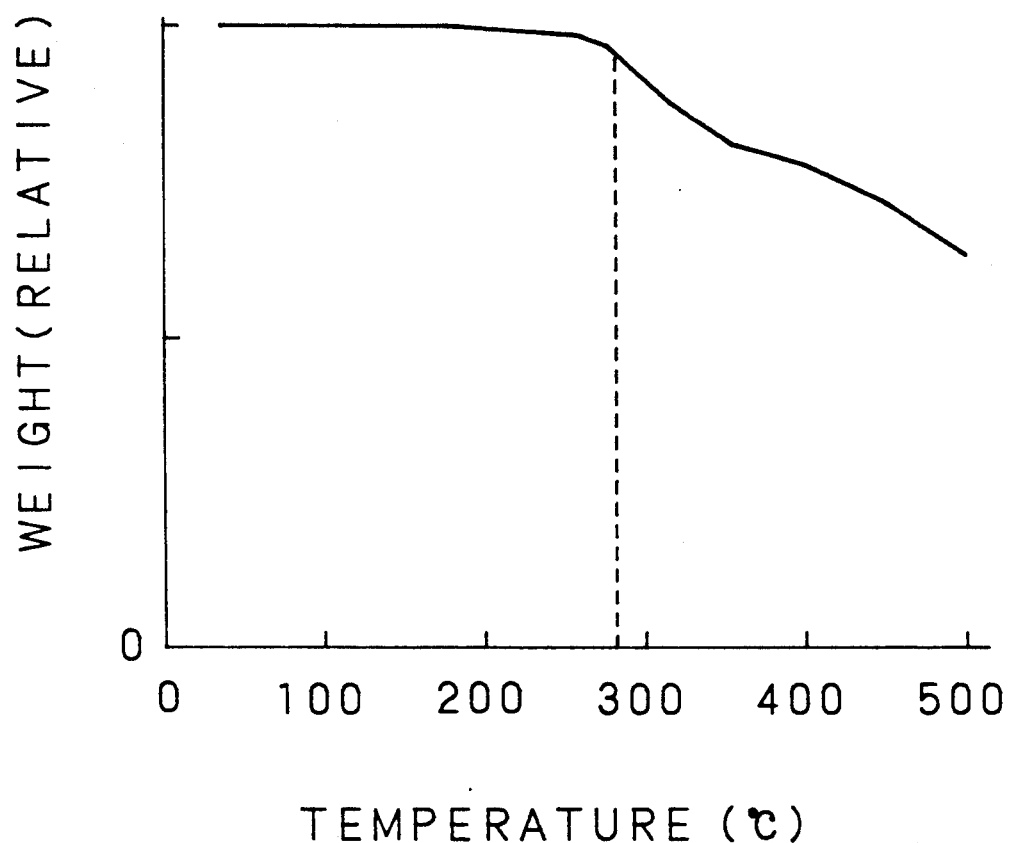
FIG. 5 is a graph showing the relation between the temperature of an organic resin by thermogravimetric analysis and the relative weight, for obtaining the decomposition point of the organic resin.

FIG. 5 shows the result of measurement of decomposition point of the AZ photoresist thermoset at 240° C. The decomposition point is found by the thermogravimetric analysis of the sample in N$_2$ atmosphere. It is known from FIG. 5 that the weight of the sample suddenly decreases around 280° C. (this is the decomposition point), and the weight continues to decrease therefrom.

Figure 6:
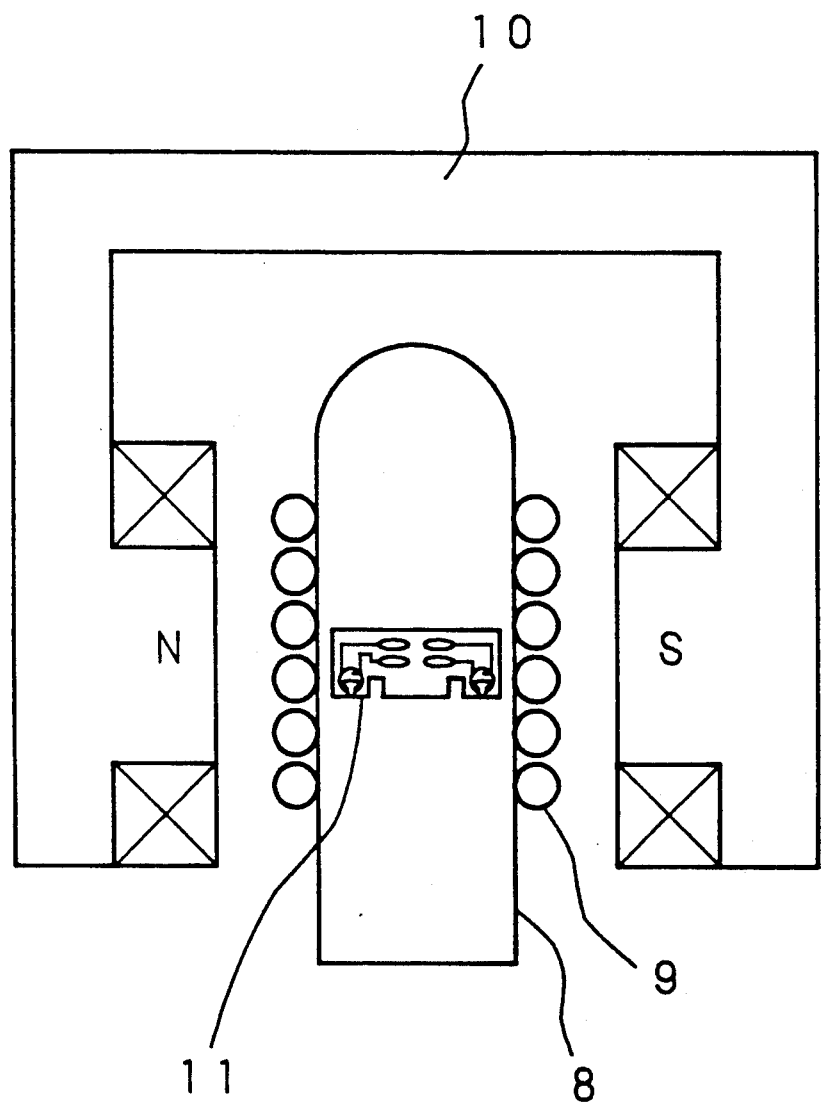
FIG. 6 is a schematic sectional view showing the composition of heat treatment apparatus used in the manufacturing method of the invention.

FIG. 6 is a block diagram showing a heat treatment apparatus relating to an embodiment of the invention. Numeral 8 denotes a vessel for creating vacuum or inert gas atmosphere for inhibit oxidation of the magnetic core, numeral 9 denotes a heater, numeral 10 denotes a magnetic field generator, and numeral 11 denotes a slider sample with a thin film magnetic head formed thereon. The magnetic field generator 10 plays an assistant role in returning the magnetic domain to a favorable state by force, through applying a magnetic field to the thin film magnetic head in the track widthwise direction. The upper limit of the heat treatment temperature is limited not only by the decomposition point of the organic resin used for the insulation layers, but by the heat resistance of the magnetic core material.

Figure 2A:
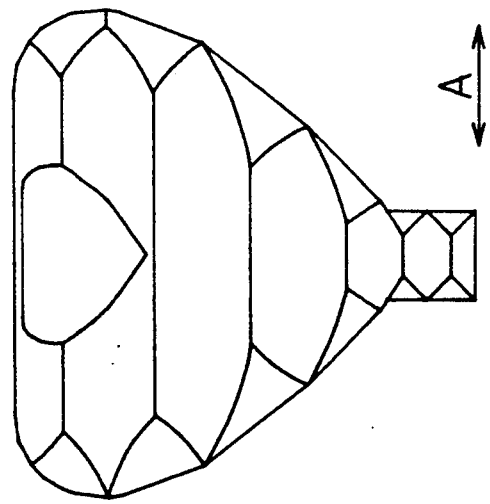
FIGS. 2(a) and 2(b) are schematic diagrams showing a magnetic domain shape of an upper core.
Figure 2B:
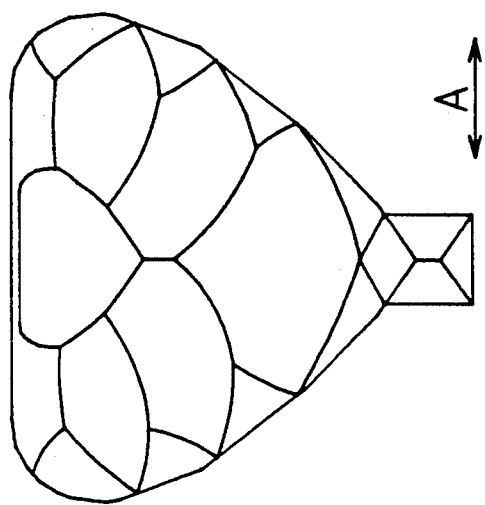
Figure 3A:
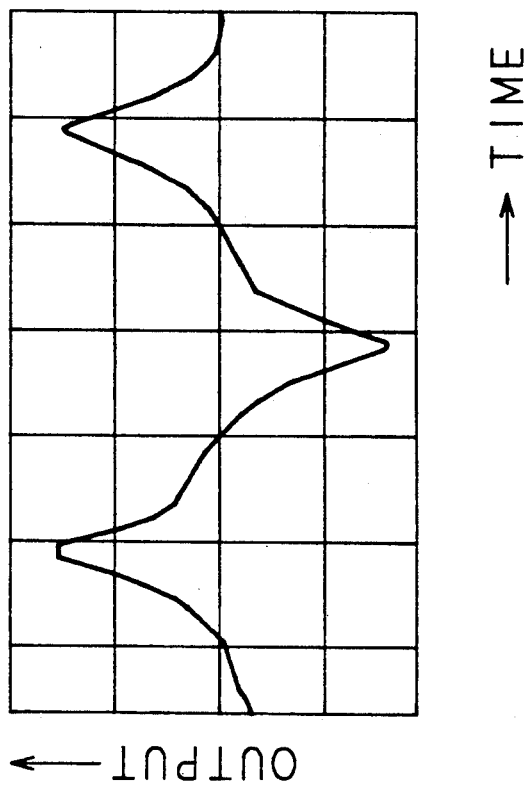
FIG. 3(a) and FIG. 3(b) are a waveform diagrams of regenerated signal that are regenerated by thin film magnetic head.
Figure 3B:
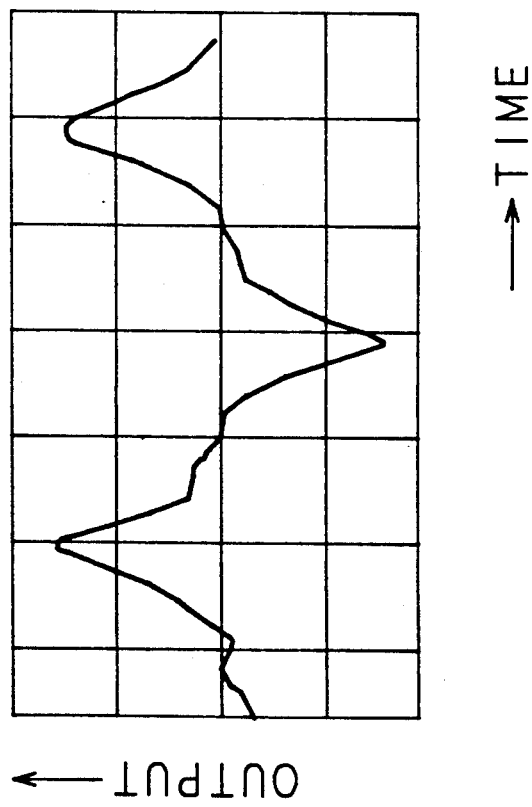

FIGS. 2(a), (b) show examples of the magnetic domain shape of the upper core observed through the sputtered protective film of Al$_2$O$_3$, by applying Kerr's effect through the use of a laser. The thin film magnetic head is composed of NiFe alloy, formed by plating as magnetic core, AZ photoresist, thermoset at 240° C., as an insulation layer, and Al$_2$O$_3$, formed by sputtering as protective film, which is heated after forming the protective film. The heat treatment conditions are: a vacuum with a magnetic field of about 2.5 KOe applied. Each sample is held at 100° C., 125° C., 150° C., 175° C., 200° C., and 225° C. for 90 minutes each. At 150° C. or less, as shown in FIG. 2(b), certain heads have defective magnetic domain shapes, but at 175° C. or more, all heads have favorable magnetic domain shapes as shown in FIG. 2(a). In the final electrical evaluation, all heads heated to 175° C. of higher temperature are free from wiggle noise. To elucidate this phenomenon, the stress is analyzed by finite element method, of which result is shown in FIG. 7. By the analysis, since the resin is softened at a temperature higher than the softening point, the insulation films are assumed to be stress-free such that the internal stresses are absorbed. On the other hand, by calculating the stress in the cooling step after rehardening the resin, it is known that the tensile stress is applied to the lower core and upper core in a direction vertical to the track width (B direction by an arrow in FIG. 7). More specifically, the magnetic core exposed to complicated stresses due to internal stress of film forming and thermal hysteresis receives the stress in a specific direction by the final heat treatment. When the soft magnetic thin films of the lower core and upper core have a negative magnetostriction constant, the magnetic domains are supposed to be aligned in the track widthwise direction. The alignment is due to the countermagnetostriction effect that results from the above-mentioned stress being applied, which results in the magnetic domain shapes as shown in FIG. 2(a).

At 280° C. or higher, meanwhile, the decomposition of the AZ photoresist thermoset at 240° C. is promoted, and the long-term reliability of the magnetic head is spoiled, and therefore, the heating temperature must be kept at 280° C. (decomposition point) or below.

Thus, even if the magnetic characteristics originally possessed by the magnetic core deteriorate due to stress effects, when the core is heated at a temperature above the softening point of the thermoset photoresist used as the insulation layers, the magnetic core, having the internal stress that is absorbed and relaxed by softening has tensile stress in a direction vertical to the track width when rehardened, so that the favorable magnetic characteristics is recovered and be stable.

In the foregoing embodiments, the AZ photoresist thermoset at 240° C. is used as the insulation layers, but similar effects are expected when other organic resins are used.

As the insulation layers, an inorganic insulator such as Al$_2$O$_3$ may be used, which may be heated at around 300° C., for example, after forming the protective film. In this case, the softening effect of the foregoing embodiments is not expected, but the internal strain in the magnetic core produced up to the final step is eliminated by heating.

The timing of the heat treatment process of the embodiment is not discussed above, but it is desired to heat the head so as not to cause other problems.

In the foregoing embodiments, as shown in FIG. 6, an example of heat treatment by applying a magnetic field is shown, but the same effects are exhibited without applying a magnetic field.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A method of manufacturing a thin film magnetic head having a substrate, a lower core of magnetic film, a first insulation layer situated on top of the lower core, a second insulation layer and an upper core of magnetic film situated on top of the second insulation layer, comprising steps of:

sequentially laminating the lower core, the first insulation layer, the second insulation layer, and the upper core, on the substrate;

laminating a protective film on the second insulation layer and the upper core; and heating the laminate, formed in the previous steps, after forming the protective film, to a heating temperature that is higher than a softening point and lower than a decomposition point of the first and second insulation layers for a sufficient time so that the stress of the upper and lower core is absorbed and alleviated and wiggle noise is reduced.

2. A method of manufacturing thin film magnetic head as set forth in claim 1, wherein the heating temperature in the third step is within the range of approximately 175° C. to 280° C.

3. A method of manufacturing thin film magnetic head as set forth in claim 1, wherein a limit of the heating temperature in the third step is less than the heat resistant temperature of the core.

4. A method of manufacturing thin film magnetic head as set forth in claim 1, wherein the third step of heating the laminate is accompanied by applying a magnetic field in a specific direction in order to align the direction of magnetic domains of the upper and lower core.

* * * * *